G. T. HEMMETER 3,152,483

WHEEL BALANCER

Filed Jan. 9, 1961

INVENTOR.
GEORGE T. HEMMETER
BY Lothrop & West
ATTORNEYS

INVENTOR.
GEORGE T. HEMMETER
BY Lothrop & West
ATTORNEYS

United States Patent Office 3,152,483
Patented Oct. 13, 1964

1

3,152,483
WHEEL BALANCER
George T. Hemmeter, 10791 Magdalena Ave.,
Los Altos, Calif.
Filed Jan. 9, 1961, Ser. No. 81,422
7 Claims. (Cl. 73—484)

My invention relates to means primarily useful in balancing an automobile wheel and tire assembly that has been removed from its normal mounting on an automobile. The demounted assembly is put upon an appropriate support with the wheel axis approximately vertical so that the plane of the wheel is approximately horizontal. The heavy portion of the wheel then depresses below the horizontal and the lighter portion correspondingly rises above the horizontal. Balance indicators of this general nature have come into widespread use and are employed in many instances for which balancers that test the wheel while on the car are not entirely suited.

Off-the-car balancers are effective in many particulars, but have some difficulties since they are easily damaged by misuse and mishandling. People who position the wheels and tires on the balancer are not inclined to utilize great care. On the contrary, there is a tendency to utilize a great deal of extra force even though the balancing unit is a relatively sensitive instrument. Damage often ensues after the customary rough treatment. The problem is to make a sensitive but durable device. Additionally, some wheels and tires to be balanced are quite heavy and hard to handle despite great care so that they are easily misplaced or misdirected or dropped and cause either substantial damage or a loss of accuracy in the balancer.

It is therefore an object of my invention to provide a balancer of the indicated type which can withstand with impunity all of the abuse and rough handling to which an article of this sort is subjected in its normal environment.

Another object of the invention is to provide a wheel balancer which can readily be utilized to indicate unbalance in wheel and tire assemblies of considerable size and weight.

A further object of the invention is to provide a wheel balancer which is of great accuracy relative to the nature of the work being done and which maintains its accuracy unimpaired over a protracted period and despite arduous usage.

Another object of the invention is to provide a wheel balancer which can be varied in sensitivity throughout a relatively wide range.

Another object of the invention is to provide a wheel balancer which is neat, compact, sturdy and economical.

A still further object of the invention is to provide a wheel balancer which can readily be utilized in the normal environment and without any special adaptation or training of the user.

Another object of the invention is in general to provide an improved wheel balancer.

Other objects together with the foregoing are attained in the embodiments of the invention described in the accompanying description and disclosed in the accompanying drawings in which.

2

The wheel balancer is conveniently described in connection with its use to indicate unbalance of an automobile wheel and tire assembly. Such an assembly usually includes a pneumatic rubber tire 6 of the usual sort which is mounted on a metal wheel 7 having a central disc 8 with a central opening therein concentric with the tire 6. The disc 8 is disposed to one side of the central plane of rotation of the tire so that the general center of gravity of the tire and wheel assembly is below the horizontal plane of the disc 8.

The balancer mechanism is designed to be suitably supported on the floor 12 or other approximately horizontal support and incorporates a base 13, usually a metal casting of considerable stability. The base is formed with a central hub 14 in which is mounted an upright 16 symmetrical about a first vertical axis 17. The upright 16 is appropriately held in the boss 14 by means of a set screw 18. As a matter of convenience, there is also mounted on the upright 16 and resting on the boss 14 an appropriate tray 19 or container for balance weights to be utilized in a balancing operation. The tray 19 does not affect the operation of the remaining part of the structure and is so located only for the operator's convenience.

At a suitable height above the floor 12 the upright 16 terminates in a first bearing member 21 formed with a sperical surface 22 upwardly convex and extending symmetrically to and downwardly of the axis 17. The surface 22 is of considerable area so that the member 21 is virtually a large ball and so is able to support without difficulty a very substantial load, especially a high shock load.

Designed to cooperate with the first bearing member 21 is a second bearing member 24 characterized by a lower spherical face 26. This is open downwardly and is concave and in effect is a socket substantially symmetrical about a second axis 27. The second bearing member 24 is conveniently mounted and centered at the lower end of a sleeve 28. The external portion of the sleeve is provided with screw threads 29 to establish an axially adjustable connection with a depending tube 31 substantially coaxial with the axis 27 and extending downwardly along the upright 16. At the lower end, the tube 31 is provided with a stop ring 32 to assure that a surrounding hub 33 is firmly held in place, particularly against downward displacement, although the hub is tightly pressed into position upon initial assembly with the tube 31. The hub 33 is provided with an outstanding flange 34 forming part of a wheel-supporting device 35. A band 36 is also included in the wheel-supporting device and ends in an upper reinforced flange 37 affording a top planar surface 38.

The hub 33 of the wheel supporting device 35 at its upper end serves as a seat for a helical spring 41 surrounding the tube 31 and at its upper end bearing against the hub 42 of a wheel centering mechanism 43. This mechanism includes a downwardly extending cone 44 substantially concentric with the second axis 27 and prevented from excess upward movement by a retaining ring 46 engaging the tube 31. The downwardly and outwardly flaring cone 44 extends substantially to the interior of the band or drum 36 but has adequate clearance with respect thereto so that a superior force can depress the member 43 axially downwardly to occupy a lower position, substantially as shown by the broken lines in FIGURE 1. When the superior load is removed, the cone is slidably restored by the spring 41 to its upper position against the stop ring 46 as shown in full lines in FIGURE 1.

Pursuant to the invention, the upright 16 is utilized not only as a mechanical support for much of the mechanism, but is also utilized as a fluid or air conduit. Air under pressure, such as that usually found in tire servicing stations, say of fifty to seventy-five pounds per square inch pressure, is made available through a supply duct 61 passing through an appropriately formed wall 62 in the base 13. The duct 61 leads to a rotary valve 63 having at least two positions, one of the positions blocking flow from the duct 61 and the other position permitting flow from the duct 61. The valve 63 is conveniently screwed to the bottom, depending end of the upright 16 depending into the space within the base 13.

The valve 63 is conveniently operated by a lever 64 engaging the actuating shaft 66 of the valve and extending outwardly from the base through an irregular slot 67 and terminating in a pedal pad 68. A spring 69 normally urges the lever 64 upwardly into an "off" position of the valve 63 to block flow from the duct 61, but the lever 64 can be depressed and can be laterally hooked under an offset shoulder 71 in the wall of the opening 67 in order that the spring 69 can be retained extended and the valve 63 held in "on" position. The user, by suitably moving the lever 64 slightly sideways, can disengage the lever from the shoulder 71 so that the spring 69 can return the lever and valve to off position.

Air under pressure from the pipe 61 and passing through the open valve 63 can flow through the upright 16 to the upper end thereof. The interior of the member 21 is especially contoured to provide not only a central chamber 76, but also a central duct 77 extending along the axis 17. The duct 77 at its upper end opens through the spherical or rounded surface 22.

When air under pressure flows through the duct 77, it has the effect of lifting the socket member 24 and all parts associated therewith slightly above or away from the surface 22 of the ball member 21. While the air flowing from the duct 77 lifts the mechanism previously resting on the ball member 21 only a very small amount, this is an amount sufficient to permit rapid issuance of air from the edge of the space 78 or volume intervening between the substantially complementary surfaces 22 and 26 of the spherical members. The nature of the contour and surfaces of the parts is such that there is a pronounced Bernoulli effect of the flowing air. That is, the ball and socket members do not act primarily as a cylinder and piston to produce a positive displacement which increases with increasing volume of air, but rather the air under pressure in flowing through the relatively narrow space 78 and in escaping from its elevated pressure down to substantially atmospheric pressure at the margin of the space 78 is accelerated to a relatively high velocity.

The accelerating, tangential or approximately radially (of the axis 17) outward flow of the air affords a very thin air layer or cushion in the space 78. While at rest without air flow the parts 24 and 21 are normally in physical contact, the air flow slightly lifts them apart or separates them so that they can be described as only in "substantial" and not actual contact. The entire load on the member 24, that is, the downward or gravitational load, is transmitted solely to the member 21 but only through the intervening, flowing air. This provides a bearing support for the member 24, and everything connected with it or resting on it, which is very nearly frictionless. That is to say, the member 24 can rotate around the center of curvature of the surfaces 22 and 26 or can rock in any vertical plane through the center of curvature with practically no resistance. That means that the axis 27 can readily assume an attitude with respect to the axis 17 which is dependent solely upon the balance of the load on the member 24.

Stated differently, the axis 27 always intersects the axis 17 but does so at different angles, depending entirely on the gravitational load on the member 24. In fact, the axis 17 need not be precisely vertical, and the base 13 can actually rest somewhat unevenly on a non-horizontal floor 12. Yet, the axis 27, when there is air flow through the space 78 and when the member 24 is evenly loaded, will assume a position precisely vertical or very close thereto.

When the valve 63 is closed and there is no air flow through the upright 16, the load downwardly on the member 24 brings the surfaces 26 and 22 into normal direct load-bearing contact. When there is no air flow a relatively large support area is available because the two surfaces 26 and 22 are of substantial extent relative to the loads, even shock loads, that may be imposed thereupon. While the bearing friction is high, too high for good balancing, the structure is not damaged by any abuse that the machine may be subjected to.

If the two relatively large friction surfaces were left in normal direct abutment for balance testing, they would involve so much frictional interengagement that nothing like a delicate or even commercially satisfactory balance could be obtained. However, when air is flowing through the space 78, the surfaces are slightly separated, perhaps only by a monomolecular layer of air, and the friction therebetween is virtually nil. By this means there is provided a bearing interconnection which, except for the balancing operation, imposes a relatively high frictional load but is capable of withstanding all sorts of abuse, yet when the air is flowing during the balancing procedure, the friction is cut down to a very small value. If the air is left running all of the time, as sometimes is the case since the amount escaping is small, the air cushion in the space 78 is itself effective to resist substantial damage to the parts by gross overload or abuse, so that under all circumstances the mechanism operates effectively.

The relatively low friction between the members 21 and 24 when the air is flowing is such that if the air supported or upper mechanism is set into vibration or oscillation, that motion may persist for a very long time after the initial disturbing force has been removed. For that reason, I provide a suitable damping mechanism effective in all directions. This mechanism conveniently takes the form in the present instance of a liquid-retaining cup 81 having a central boss 82 extending for some distance along the upright 16 and secured thereto at any temporarily chosen height by a set screw 83. The cup extends in surrounding relationship with the depending portions of the tube 31 and the hub 33. The rim 84 of the cup and the height of the central hub 82 are such that a substantial body 86 of relatively viscous oil or the like can be disposed in the cup and around the central boss without danger of overflow, despite lack of horizontal attitude of the device.

While the depending portions 31 and 33 can move within the liquid, a certain amount of energy is required for such motion and acts as a damper or oscillation suppressor for the balancing mechanism. The repetitive swings of the balancing mechanism when initially disturbed are appropriately damped out within a reasonable time. The vertical location of the cup 81 governs the amount of immersion and the viscosity of the liquid also governs the energy transferred in unit time so that the damping can be varied by changing either factor or both.

In addition to oscillations set up by a temporary disturbing force, it has been found in practice that sufficient energy may be introduced into the balancing system by the flowing air so as to set up or maintain oscillations in the system. That is, the air mechanism acts in effect as a weak air motor so that disturbances introduced by the flowing air or sustained by the flowing air do not die out. To preclude this, the member 21 near its periphery is formed with a groove 87 at intervals pierced by discharge openings 88 symmetrically disposed with regard to the central inlet duct 77 and parallel thereto. The groove 87 and the openings 88 serve as a ready exhaust channel for the flowing air from the duct 77. The openings 88 discharge the air in an axially downward direction so that it does not substantially impinge on the surrounding movable parts. Furthermore, the groove 87, being located inwardly from the rim of the member 21, is in such location that the upper member 24 cannot rotate about the center of curvature or oscillate enough to uncover the groove 87 on one side only and thus provide a short asymmetrical path for the air.

Since the groove 87 and the outlets 88 are completely symmetrical with the incoming air duct 77 and since they are so located as never to be uncovered within the limits of oscillation of the member 24, the discharge path for the air remains substantially constant and non-disturbing despite variations in attitude of the different parts of the structure. The discharging air from the ducts 88 flows generally downwardly through a large volume and escapes through relatively large openings 89 in the wall of the tube 31 and thence to the interior of the support 34, which itself is provided with large openings 91 to the atmosphere. Thus the air can immediately escape, flowing with very low velocity and through symmetrical discharge passages and can rejoin the atmosphere without any material disturbing influences.

To make sure that the amount of oscillation of the upper member 24 is not sufficiently great so as to disturb the air path, a suitable stop ring 92 is formed on the lower face of the flange 34 and is in position to abut the wall 84 of the oscillation damper mechanically to preclude excess tipping of the upper mechanism in any circular position thereof.

In order that the attitude of the axis 27 can readily be determined, a special level indicator 93 is provided. For coarse work or under certain circumstances, the indicator 93 can be dispensed with and the attitude and location of the mechanism can be judged by eye. However, for more consistent results, it is preferred to provide an indicator such as the mechanism 93. While this can be a somewhat more elaborate mechanism, such as an electrical indicator, it has been found in practice to be satisfactory to utilize a universal level. This includes a cup 94 held in position within an appropriate recess in the upper end of the member 28 by a friction ring 95. The cup 94 contains an appropriate liquid 96 and a curved view glass 97, the liquid 96 being scant so as to leave an air bubble 98. The glass 97 can be provided with cross hairs, a central circle or other indicia for indicating a datum position.

The function of the level or indicator 93 is to indicate the position of the mechanism connected to the member 24 with respect to a vertical axis. Whenever the axis 27 is vertical, the bubble 98 is central. If the axis 17 is considered as vertical, as it is when the floor 12 is completely level, then when the axis 27 coincides with the axis 17 the bubble 98 will be precisely centered in the glass 97.

In the use of this device, it can be assumed that the air is normally off and the member 24 and its attendant structure are mechanically resting against the member 21 in any frictionally retained attitude. If the air is assumed to be left flowing, the parts are in the same general relative position, but the member 24 is infinitesimally higher than before, being out of physical contact with the member 21, and due to the reduced friction thereby the parts connected to the member 24 are symmetrical and are disposed with the surface 38 in a horizontal plane or with the axis 27 vertical.

A tire and wheel assembly removed from their vehicle are somehow lifted and deposited on the balancing structure. The central flange 8 of the wheel falls onto the cone 44. The cone serves as a guide and centers the wheel and tire with respect to the axis 27, but the resistance of the spring 41 is low enough so that as the centering operation takes place the wheel and tire also descend, compressing the spring until such time as the wheel 7 rests upon the flange 37 coincident with the surface 38. In this lodged position, the center of gravity of the wheel and tire assembly is considerably below the center of curvature of the ball and socket.

If the air has not previously been flowing, the operator then depresses the lever 64 and usually hooks it into place under the shoulder 71 so that the air continues to flow. The air then passes upwardly through the upright 16 and through the duct 77 to discharge through the space 78 in a generally radially outward direction and then flows largely into the groove 87 and downwardly through the openings 88, there being very little air discharge around the remaining periphery of the member 24. The discharged air flows harmlessly through the interior hollow tube 31, passing through the openings 89 and the subsequent openings 91 to the atmosphere.

If the wheel and tire are not perfectly balanced, and that is usually the case, the unbalance of the assembly forces the axis 27 to assume a corresponding attitude by pivoting about the approximate center of curvature of the surfaces 22 and 26 until the sustained parts are in balance. The movement of the supported parts is sufficiently slowed or damped by the liquid 86 so that after a short interval the parts slowly approach and then remain in the new position. The bubble 98 remains in uppermost position so that by observation the user can see the radial extent of displacement due to unbalance and can see the polar or azimuthal location of the high or low point of the unbalanced wheel.

By rotating the sleeve 28 relative to the tube 31, the main mass of the parts supported on the member 21 is raised or lowered. This moves the center of gravity of the main, supported mass up or down relative to the center of curvature of the surfaces 22 and 26, taken as the support point. The center of gravity is usually a substantial distance below the center of support so the device is quite stable and relatively less sensitive. When the center of gravity is raised, the sensitivity is increased, that is, the pendulum effect is decreased.

Figures 2, 3, 5:
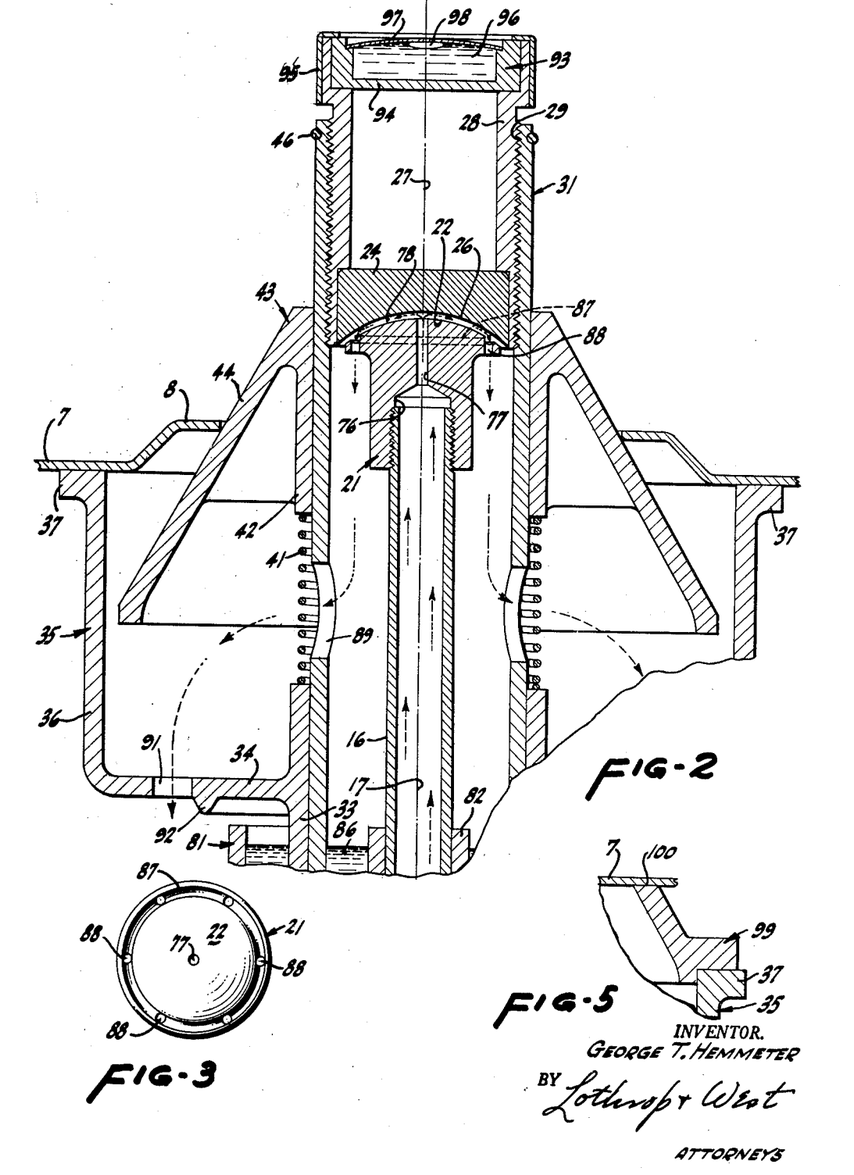
FIGURE 2 is a cross section similar to FIGURE 1 but to an enlarged scale and showing additional internal construction of the wheel balancer, certain portions of the figure being broken away.
FIGURE 3 is a detail showing in plan a part of a bearing member illustrated in FIGURES 1 and 2.
FIGURE 5 is a cross section of a part of an adapter to increase the sensivity of the device.

As an alternative to the threaded tube 31 and sleeve 28 or as an additional device for changing sensitivity, there may be provided, as shown in FIGURE 5, a loose or detachable ring 99. When the ring is centered on the flange 37, there is provided a higher wheel-supporting surface 100 so that the center of gravity is raised and the sensitivity is increased.

In the usual instance, compensating weights are taken from the tray 19 and are attached to the rim of the wheel 7 until such time as the axis 27 is in exact or sufficiently close coincidence with the axis 17 or so that in effect the bubble 98 and the markings on the glass 97 are substantially coincident or centered. Following this, the wheel and tire are lifted from the mechanism, leaving the flange 37 behind and permitting the cone 44 to rise under the influence of the spring 41 into abutment with the retaining ring 46. Subsequently, the user disengages or releases the lever 64 and the valve 63 cuts off the supply of air. The mechanism is then ready for a subsequent use.

Figure 1:
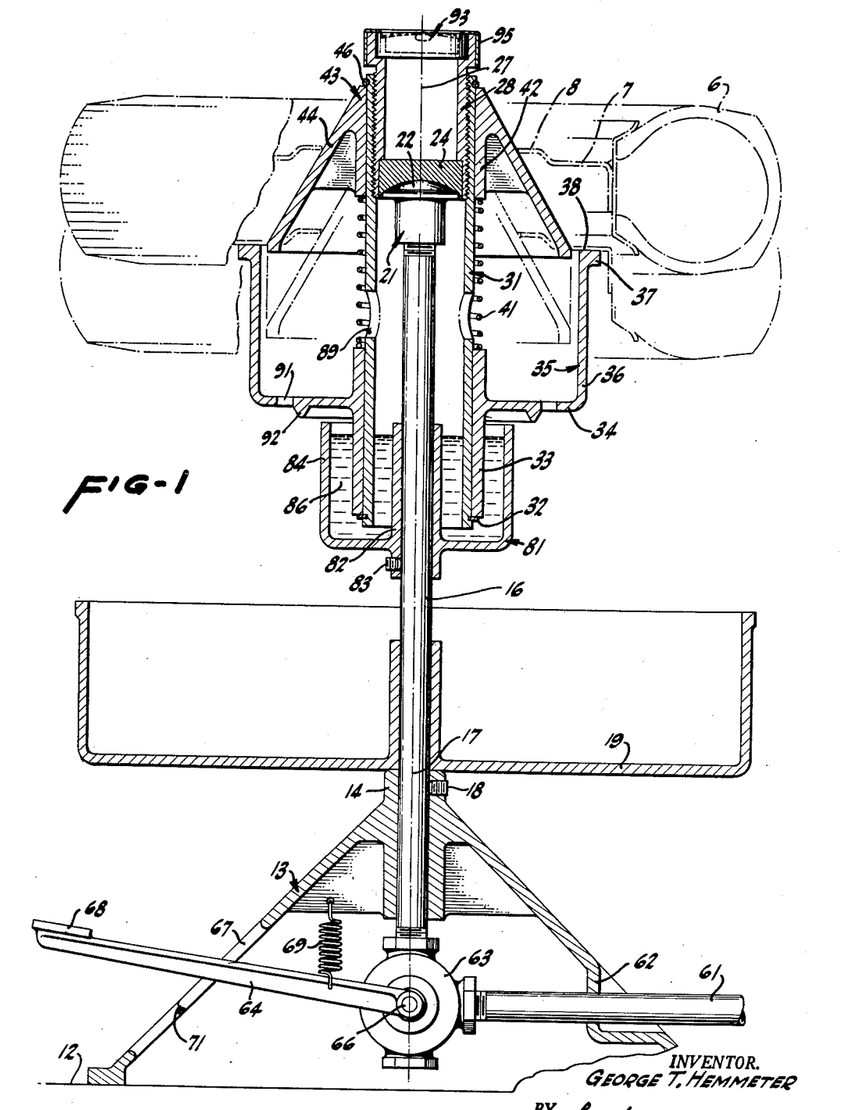
FIGURE 1 is for the most part a cross section on a vertical central plane through one form of wheel balancer constructed in accordance with the invention. The figure shows some of the parts in different positions, indicates a wheel and tire in phantom lines and has a portion broken away to reduce the figure size.
Figure 4:
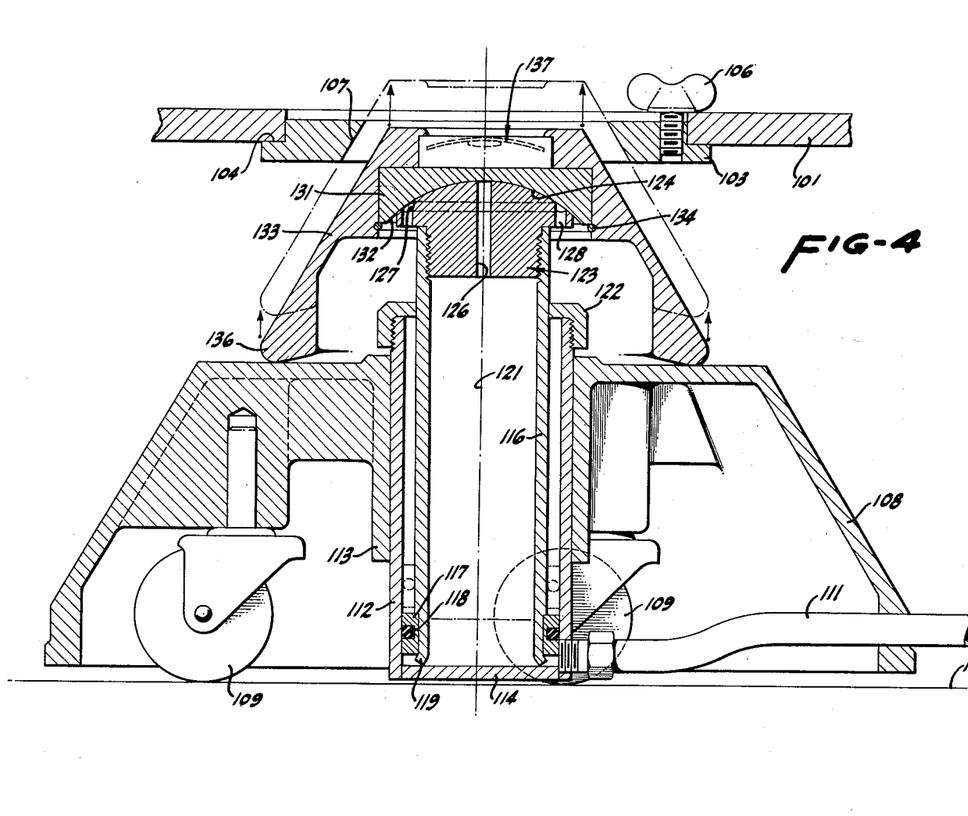
FIGURE 4 is a cross section somewhat similar to FIGURE 1 and taken on a vertical central plane and showing a modified form of the wheel balancer of the invention, certain portions of attendant structure being broken away.

In many instances it is desired to utilize a mechanism of this sort with a tire and wheel assembly which is too heavy to be readily lifted into the position shown in FIGURE 1. This is especially true in connection with truck wheels and tires, which are normally made with the rotational plane of the wheel at a substantial axial distance away from the central rotational plane of the tire. This distance is such that if the tire is placed flat on a supporting horizontal surface, the plane of the wheel is a number of inches, for example, eleven inches, from the floor. Consequently, there is provided in accordance with this invention and as shown in FIGURE 4 a modified form of device which is useful in connection with a truck wheel 101 which is assumed to be in substantially horizontal position relative to a floor 102 and to be sustained above the floor by an attached tire, not shown.

The wheel disc 101 varies substantially from installation to installation as to its center dimension and hence there is provided an adapter 103 having a step 104 formed therein against which the wheel disc 101 can be lodged. Different adapters accommodate different sized and contoured wheels. The appropriate adapter is temporarily secured in place by removable bolts 106. The adapter has a generally conical interior surface 107. In use, after the adapter has been fixed in position the assembled wheel, tire and adapter are moved into a horizontal position approximately overlying a previously positioned balancer unit.

This unit includes a base 108 supported on a plurality of casters 109 so that the base can readily be moved around over the floor. An air pipe 111 extends through the base and into a cylinder 112 which is firmly fixed in a central boss 113 forming part of the base. The cylinder is closed at its lower end by a plate 114 and contains a hollow plunger or piston 116. A band 117 with a sealing ring 118 therein is held in position on the piston 116 by an out-turned flange 119 so that the band 117 is secured against a shoulder. The piston 116 is reciprocable along an axis 121 within the cylinder 112, its travel, however, being limited at one end by contact with the plate 114 and at the other end by a flanged collar 122 which is threaded onto the upper end of the cylinder and extends inwardly into the path of the band 117.

Screwed tightly into the upper end of the piston 116 is a ball-like member 123 having an upper convex spherical surface 124 of the type previously described and being provided not only with a central air supply duct 126 communicating with the interior of the piston 116, but also being formed with a peripheral groove 127 and appropriate discharge ports 128 communicating therewith. Cooperating with the ball-like member is a socket-like member 131 having a nether downwardly concave spherical surface 132 substantially complementary to the surface 124. The member 131 is held in socketed position within a cone 133 by a ring 134. The cone 133 extends downwardly and is provided with an enlargement 136 at its lower end so that the center of mass or center of gravity of the cone is substantially below the center of curvature of the surfaces 124 and 132, so that the cone is normally in stable equilibrium with the member 131 resting on the member 123. The upper part of the cone is provided with a universal level 137 or other appropriate indicating device, preferably one as shown in detail in FIGURE 2.

In the operation of this structure, the base 108 is initially wheeled to an appropriate location and the tire and wheel assembly with the adapter associated therewith are approximately centered over the base. The air is then permitted to flow in through the pipe 111 and enters the cylinder 112. The air pressure is exerted then on the piston 116 and the entire area of the piston is effective to receive the air pressure so that the piston 116 is promptly raised. The cone 133 is correspondingly raised and, although it may previously have been off center with respect to the conical surface 107 of the adapter, forces its way upwardly into a central location, the base 108 shifting on the casters 109 until the parts are automatically centered. Further movement of the piston 116 upwardly within the cylinder 112 lifts the wheel 101 and its associated tire from the floor 102. The parts lift for example as shown by the broken lines in FIGURE 4 or considerably higher until the band 117 is in firm abutment with the stop 122 so that the entire supporting mechanism is substantially rigid and corresponds in effect to the upright 16 in the FIGURE 1 structure.

Air which has entered through the pipe 111 to the hollow piston 116 slowly flows through the duct 126 and through the space between the surfaces 124 and 132 and escapes through the groove 127 and the ducts 128 and to the atmosphere beneath the lifted cone 133. This air is continually being replaced and so keeps the piston extended despite sufficient outflow for bearing purposes. A substantially frictionless single support bearing is thus provided with the entire weight of the tilting mechanism being singly sustained through the ball and socket bearing and on an air cushion or film so that the friction is extremely small. The relative position of the parts can be observed by eye or preferably by a reading of the indicator 137. Balancing weights are fixed as before. When the balancing operation has been completed, air is released backward through the pipe 111 or air is cut off and eventually leaks out through the openings 128 so that the parts descend to their original position with the cone 133 falling out of engagement with the adapter 103. The wheel 101 is then removed, the adapter 103 detached and the mechanism is ready for subsequent operation.

Various adjuncts or accessories are helpful in the utilization of the wheel balance mechanism. For example, as shown particularly in FIGURES 6 and 7, I provide a diametrical strap 141 having a central hub 142 with an opening 143 therein designed to fit around the outside of the member 95 and so to be symmetrically mounted. The strap 141 is generally in the shape of an arrow and is itself in symmetrical balance. It is long enough so as substantially to rest on a subposed tire when the tire is mounted on the balance mechanism. Adjacent one end the strap 141 is provided with a plurality of transversely extending ridges forming serrations 144 disposed in two series on opposite sides of a central slot 146. Designed to rest in the serrations 144 is a cross rod 147 or "pencil" having a length approximately equal to the diameter of the wheel and having a central bead 148 freely receivable in the slot 146.

Figure 6:
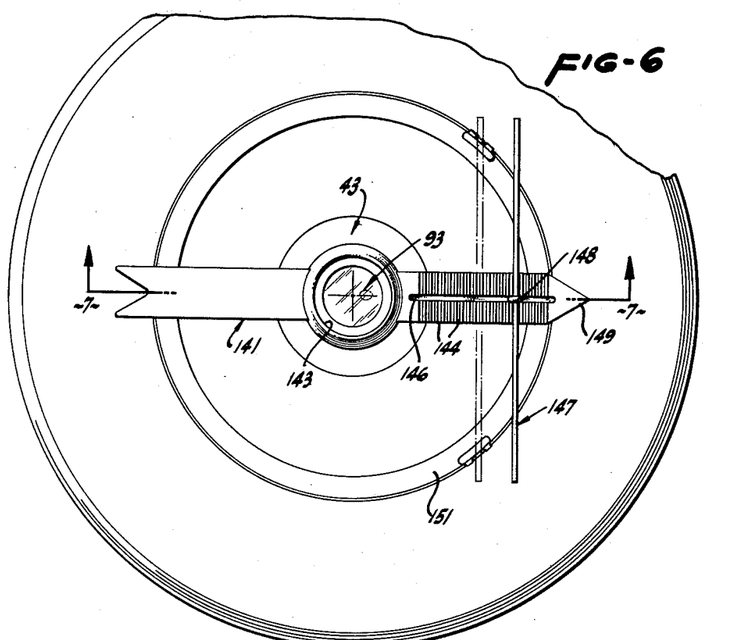
FIGURE 6 is a plan of an accessory for use with the wheel balancer mechanism.
Figure 7:
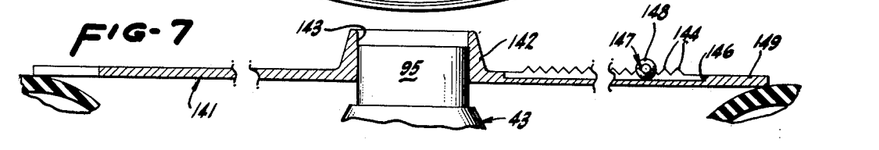
FIGURE 7 is a cross section, the plane of which is indicated by the line 7—7 of FIGURE 6.

In the use of this device the strap 141 is assembled as shown in FIGURES 6 and 7 and is rotated by the operator so that the point 149 of the strap is directed toward the high or light part of the unbalanced tire or wheel. The pencil or rod 147 is then put into position near the arrow point 149 and remains in such position temporarily. It is observed whether or not the added weight of the rod 147 causes the wheel to assume a substantially horizontal position with the bubble becoming centered. It is likely that the weight of the pencil or rod 147 in the extreme outermost position will cause excessive deflection and cause the previous high part of the tire to dip to a low position and the bubble to change sides. The pencil or rod 147 is then moved radially inward toward the center and by trial and error is shifted from serration to serration until such time as the bubble is centralized and the mechanism has a generally horizontal attitude.

The rod 147 then overlies the wheel rim 151 in two places substantially as shown in the dotted lines in FIGURE 6. The operator then either applies two weights to the rim 151 immediately below the two ends of the overlying rod 147 or applies four weights, two of them to the rim flange immediately below the rod 147 and the other two in direct vertical alignment therewith on the lower flange of the rim 151. In the first instance, where only two weights are utilized, each one is half of the known weight of the pencil 147, whereas if four weights are utilized, each one is but a quarter of the known weight of the pencil or rod 147. When the structure has been so balanced, the pencil or rod 147 and the strap 141 are removed and the tire is ready to be taken from the balance mechanism for use.

This structure is easily operated, the rod 147 being held in any one of a number of radial positions and also being held against lateral displacement, yet serves as a true and direct indicator of the proper position on the rim of counterbalancing weights.

Figure 8:
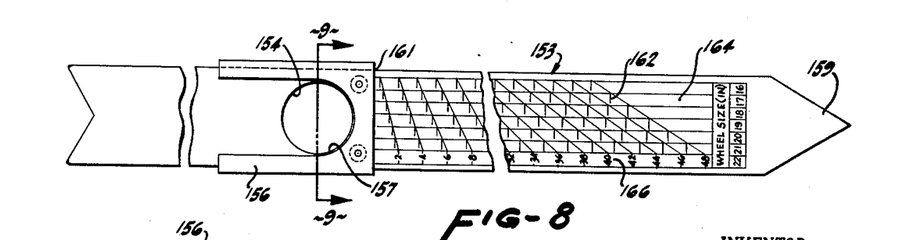
FIGURE 8 is a plan of another accessory for use with the wheel balancer mechanism.
Figure 9:
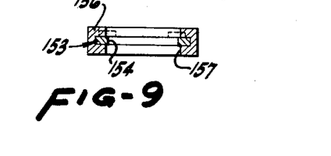
FIGURE 9 is a cross section, the plane of which is indicated by the line 9—9 of FIGURE 8.

A somewhat comparable device is shown in FIGURES 8 and 9. In this instance there is provided a diametrical strap 153 which is symmetrical about and is balanced around a central aperture 154 designed to fit on the balance mechanism just as does the strap 141. Conveniently, the strap 153 is made of ferrous material. Slidably mounted on the strap is a runner 156 having a grooved interrelationship with the strap so that the runner can be moved freely along the strap, the runner itself having an arcuate cut-out 157 to accommodate the central portion of the balance mechanism. When the runner is in the position shown in FIGURE 8, the strap assembly is completely balanced but when the runner is moved toward the right in FIGURE 8, the runner adds more and more weight to the portion of the strap 153 carrying an arrow terminus 159.

The leading edge 161 of the runner is moved into a position wherein the wheel is balanced. In that position the leading edge 161 coincides with a mark 162 which is one of a plurality of similar marks etched or otherwise appearing on the face of the strap 153. The mark 162, for example, appears in an appropriate one of a number of columns such as 164 provided for wheels of known diameter. The columns each have a plurality of marks such as 162, the marks by reference to an associated indicium 166 indicating the value in ounces, for example, of a single weight which should be applied to the wheel rim. In the use of this device balance is achieved by moving the runner 156 to the appropriate location, looking in the column 164 corresponding to the diameter of the wheel being checked and reading the particular indicium 166 which indicates the amount of weight to be applied and then applying the weight to the wheel rim in the zone immediately beneath the arrow terminus 159.

Figure 10:
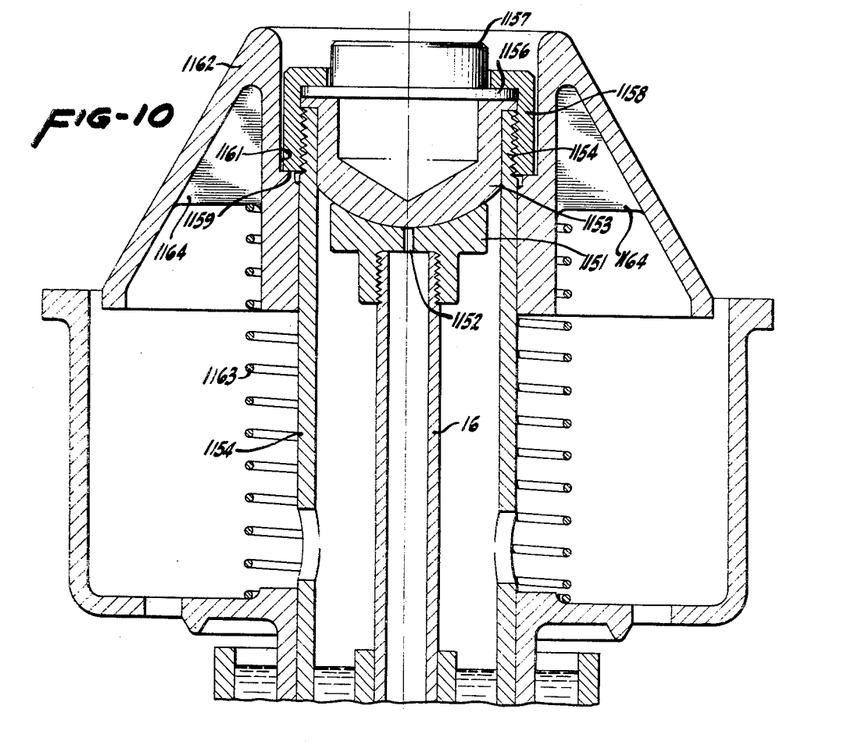
FIGURE 10 is a fragmentary view similar to FIGURE 1 and showing in cross section a modified form of structure.

Under some circumstances it is desired to utilize virtually the same arrangement as shown in FIGURES 1 and 2, but with a change in the support bearing mechanism, as shown in FIGURE 10. In this instance, unless otherwise described, the parts are the same as in the preceding figures. There is provided at the upper end of the support 16 a lower bearing member 1151 which is upwardly concave and not only fits on the support pipe 16, but has a central air opening 1152 therethrough. Resting upon the member 1151 is a downwardly convex bearing member 1153, the diameter of which is sufficiently greater than the diameter of the member 1151 so that during the oscillations of the structure the edge of the member 1153 never over-rides the edge of the member 1151. Thus, the path of escape for the air is always uniform and oscillations which might otherwise be induced by unsymmetrical air flow do not arise.

The member 1153 at its upper end is flanged and rests on the upper end of a sleeve 1154. Superimposed upon the flange of the member 1153 is the flanged lower end 1156 of a bubble device 1157. A threaded clamp ring 1158 engages the threaded upper end of the sleeve 1154 and holds the assembly in place. The lower edge of the clamp ring 1158 serves as an appropriate stop for a shoulder 1159 provided by a counterbored portion 1161 of the cone 1162. In this instance, the spring 1163 which surrounds the sleeve 1154 also surrounds the central portion of the cone and abuts radial fins 1164 in the cone. Preferably the top of the cone when the spring 1163 is relaxed is slightly higher than the top of the bubble mechanism 1157 to act as a protector for the bubble mechanism when tire and wheel assemblies are positioned on the device.

With this mechanism the bearing structure is inverted from that previously described but the general functioning and mode of operation are substantially as before.

Figure 11:
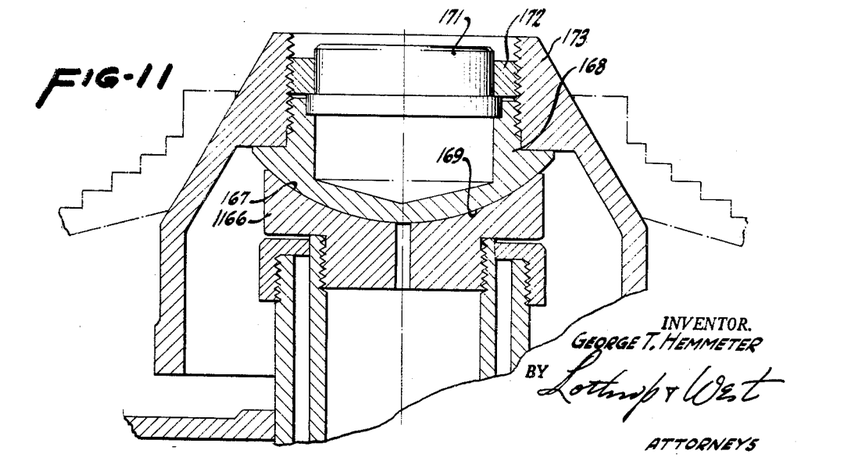
FIGURE 11 is a fragmentary view similar to FIGURE 4 and showing in cross section another modified form of construction.

Somewhat comparably, as shown in FIGURE 11, there is provided a device especially for truck wheel use in which the lower bearing member 1166 has an upwardly concave surface 167 while the other bearing member 168 has a downwardly convex surface 169. The path of air flow is as previously indicated, the diameter of the upper member being greater than that of the lower within the limits of oscillation of the structure so that there is no air-induced movement. The bubble mechanism 171 is clamped in position by a ring 172 threaded into the cone 173. The operation is substantially as previously described.

What is claimed is:
1. A wheel balancer comprising a base including a cylinder having a vertical axis, a piston vertically reciprocable in said cylinder, a spherical head at the top of said piston, a wheel support, a spherical member on said wheel support and resting on said spherical head, said spherical head and said spherical member comprising a bearing, means forming a duct from said cylinder to the space between said spherical member and said spherical head, and means for supplying air under pressure to said cylinder.

2. A wheel balancer comprising a cylinder having a vertical axis, a piston vertically reciprocable in said cylinder, a bearing head at the top of said piston, a wheel support, a bearing member on said wheel support and resting on said bearing head, means for supplying air under pressure to said cylinder beneath said piston, and means forming a duct from said cylinder through said piston to a point between said bearing head and said bearing member.

3. A wheel balancer comprising first and second members mounted in vertical reciprocating relationship; a movable base member adapted to provide unrestrained lateral motion on a horizontal surface; means stationarily mounting said first member on said movable base; a conical wheel support pivotally mounted on said second member; and means for providing reciprocation of said first and second members whereby upward extension of said second member and wheel support into the center aperture of a horizontally disposed wheel to be balanced automatically centers said wheel balancer relative to said wheel.

4. The apparatus of claim 3 in which the means for providing reciprocation of the first and second members is operable in response to a source of fluid pressure.

5. The apparatus of claim 4 in which the first member is a cylinder and the second member is a piston.

6. The apparatus of claim 5 in which the pivotal mounting for the wheel support is a spherical bearing and the spherical bearing is in fluid communication with the cylinder.

7. A wheel balancer comprising;
a cylinder having a vertical axis;
means supporting said cylinder for unrestrained lateral movement on a horizontal surface, the vertical axis of said cylinder being substantially perpendicular to said surface;
a piston vertically reciprocable in said cylinder;
a conical wheel support disposed on the top of said piston;

and means for supplying fluid under pressure to said cylinder, whereby a wheel to be balanced may be disposed over said wheel balancer on said horizontal surface and the means supporting said cylinder, upon vertical extension of the wheel support upwardly into the center aperture of a wheel to be balanced, automatically centers said wheel balancer relative to a wheel to be balanced.

References Cited in the file of this patent

UNITED STATES PATENTS

| | | |
|---|---|---|
| 2,589,456 | Tinkham | Mar. 18, 1952 |
| 2,695,199 | Blizard | Nov. 23, 1954 |
| 2,898,764 | Kinsey et al. | Aug. 11, 1959 |
| 2,909,063 | Bageman | Oct. 20, 1959 |
| 3,055,221 | Bageman et al. | Sept. 25, 1962 |